UNITED STATES PATENT OFFICE.

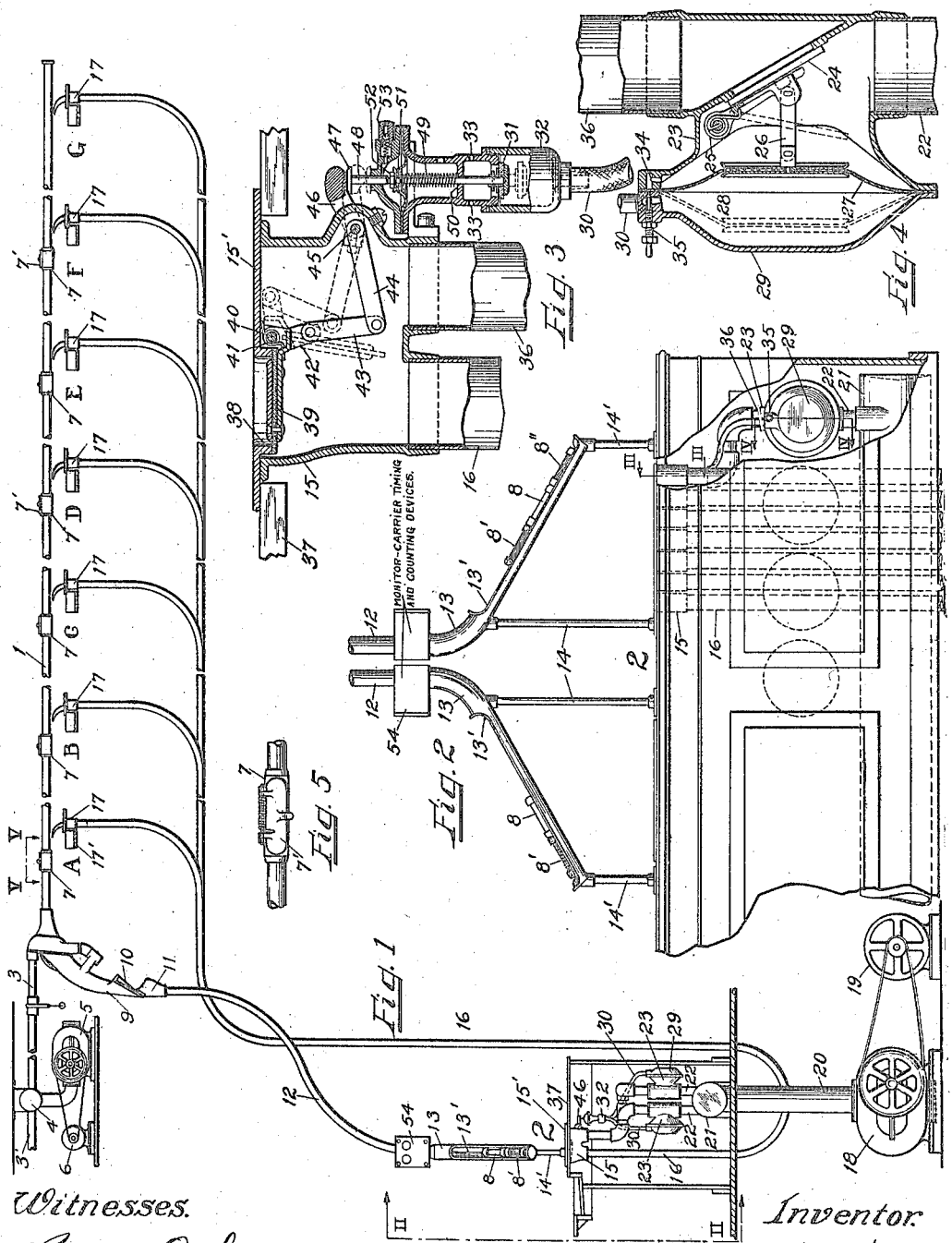

FREDERICK GAGE WHITTIER, OF IPSWICH, MASSACHUSETTS, ASSIGNOR TO THE LAMSON COMPANY, OF BOSTON, MASSACHUSETTS, A CORPORATION OF NEW JERSEY.

PNEUMATIC-DESPATCH-TUBE APPARATUS.

1,248,767.   Specification of Letters Patent.   Patented Dec. 4, 1917.

Application filed May 6, 1915. Serial No. 26,405.

*To all whom it may concern:*

Be it known that I, FREDERICK GAGE WHITTIER, a citizen of the United States, residing at Ipswich, in the county of Essex and State of Massachusetts, have invented certain new and useful Improvements in Pneumatic-Despatch-Tube Apparatus, of which the following is a specification.

This invention relates to pneumatic despatch tube apparatus and has for one of its principal objects the effecting of a very great economy in the cost of installing apparatus of this description; especially where the system is intended for use in large department stores or the like.

For certain classes of service in department stores and the like, if a pneumatic despatch tube system is to be installed at all, it is frequently demanded that certain conveniences of operation must be afforded thereby, such for example as the provision of means whereby both a cashier and an authorizer, or credit man, may have ready access to carriers pertaining to their respective departments and which carriers may be forwarded from the numerous clerk or sub-stations located throughout the store, to the so-called central station or desk at which the cashier and credit man or authorizer are stationed. To offer such conveniences usually involves the provision of numerous costly parts, such as terminals, carrier separators and the like, and the cost of these fittings frequently renders the overall cost of the system practically prohibitive for certain classes of work.

Most of the large department stores insist that credit transactions shall not be held up by preceding cash transactions, as is apt to be the case when both cash and credit carriers are transmitted from various stations through a common tube to the central desk, except when such devices as carrier separators are employed. The use of these latter devices in the system however considerably increases the cost thereof, and one of the objects of the present invention has been to provide an exceedingly simple means, or a combination of parts, whereby a pneumatic despatch tube system may be cause to afford substantially all of the advantages possessed by systems of this description which involve the use of separators, without such expensive devices; and indeed to even provide a service involving three or more classes of carriers.

At the same time that this reduction in the number of parts in the system is effected, a further aim is to economize in the power required to operate the system, and further, in so doing, to again eliminate parts.

These and other objects of my invention will be hereinafter referred to and the novel combinations of means and elements whereby said objects may be attained, will be more particularly pointed out in the claims appended hereto.

In the accompanying drawing I have exemplified a preferred embodiment of my invention; but as I am aware of various changes and modifications which may be made herein without departing from the spirit of the invention, I desire to be limited only by the scope of said claims.

Referring to the drawing:

Figure 1 is a side elevation of a pneumatic despatch tube system constructed in accordance with my said invention.

Fig. 2 is a side elevation of a portion of the central desk; the desk being viewed from the line II—II of Fig. 1.

Fig. 3 is a detail section taken on line III—III of Fig. 2.

Fig. 4 is a similar section taken on line IV—IV of Fig. 2; and

Fig. 5 is a detail plan view of a despatching box used in the system; one of the parts in question being viewed from the line V—V in Fig. 1.

As shown in Fig. 1, the system may comprise a single transmission or transit tube 1, which tube serves a plurality of clerk or sub-stations. Carriers are propelled through this tube from any one of the stations A, B, C, D, E, F or G toward the central station or desk, broadly designated 2, by atmospheric pressure; said tube 1 being normally open to the atmosphere at its extreme right-hand end, as viewed in Fig. 1, and being connected to a pipe or conduit 3 which leads to a vacuum drum 4, the air from which is preferably normally continuously exhausted by a pump or exhauster 5, driven by an electric motor 6.

As the exemplified system is intended for use in large and busy stores and the like, I have found that on the ground of economy it is frequently advantageous to run the motor 6 continuously, on account of the number of stations served by this tube; there being hence a constant carrier propelling flow of air through the pipe 1. It is preferable, also, to lead into the vacuum drum 4 other pipes 3', corresponding to the pipe 3 and which pipes correspondingly receive air from other transit tubes 1 not shown, since such tubes may be substantial duplicates of that taken by way of illustration.

Carriers to be despatched from any of the stations A, B, C, etc., may be inserted into the transit tube despatching boxes 7, which, as shown in Fig. 5, are each provided with a spring pressed, normally closed door or clapper valve 7' of sufficient length to permit of the insertion of a carrier 8, 8' or 8" into the line.

Carriers thus despatched from the stations A, B, C, etc., pass through the tube 1 until they are delivered to a casting 9 which receives said carriers successively, and the object of which is to free them from the influence of the air current. Devices of this description are very well known in the art and hence need not be herein discussed, other than to make reference to the usual flap-valve 10 past which said carriers travel when leaving the casting 9 and entering the hopper 11 thereof, which directs said carriers into the tube 12, leading downwardly to the cashier's and authorizer's stations. At the lower end of each of the tubes 12 is a long straight carrier shelf 13 of novel construction in that while it is preferably obliquely disposed at an angle of less than forty-five degrees to the horizontal to permit the carriers to descend therethrough by gravity, it is further not only adapted to maintain these carriers sequentially in the order of their arrival, but also to expose them to view and to permit of the removal of any desired carrier from the shelf without removing the carrier or carriers in advance.

To this end, the shelf 13 is cut away or apertured for a considerable distance longitudinally thereof, preferably upon its upper-side, as at 13'.

This cut-away portion is in length preferably equal to the aggregate length of at least four carriers, and the shelf is, further, so disposed with respect to the central desk as to accommodate a cashier's station, for example, upon one side of the desk and an authorizer's station upon the other side of the same. Both the cashier and the authorizer are thus afforded access to the shelf and if the cashier be stationed to the left of the shelf 13, shown in Fig. 1, he will be able to remove all cash carriers 8 which are delivered to this shelf, in sequential order; while the authorizer, stationed at the opposite side of the desk can remove the carriers 8' or 8" without waiting for the removal of cash carriers which may be in advance thereof.

The carriers 8' and 8", while both intended for the authorizer, may nevertheless carry different classes of messages. Thus, the carriers 8", may be given one color while those designated 8' may be given another, and one of these carriers may be employed to carry rush orders, instructions from the management of the store, or the like, while the other will normally convey the usual charges directed to the authorizer.

The shelves 13, there being of course one of these for each tube 12, may be supported upon uprights 14, 14', of different lengths.

Preferably, directly beneath each of the shelves 13, there is a series or group of despatching terminals 15, which by reason of their adjacency to both the cashier and the authorizer, permit of the ready despatch of carriers by either of these parties. Each of the terminals 15 deliver to a tube 16, there being of course, one such tube for each of the sub-stations A, B, C, etc. The tubes 16 as they extend away from the central desk, are at first concealed by the latter and may thereafter be extended along a wall of the building, or the like, so that they need not be conspicuous in the store. The described arrangement of parts has therefore a very real advantage in that for an extensive service, involving a considerable number of clerk stations, but very little tubing appears overhead, even at the central desk.

The several outgoing tubes 16 extend to the respective sub-stations and are each preferably provided with what is known in the art as a pig's-ear terminal, one of which is of course at each of the sub-stations. The carrier emerging from any given terminal 17 may drop into a a suitable receptacle 17', and both the despatching box or terminal 7 and the corresponding pig's-ear terminal 17, at each clerk's station may be made so small and compact as to be but slightly in evidence.

I prefer to despatch carriers from the central desk to the respective sub-stations by means of air above atmospheric pressure, and further prefer, in order to obtain the utmost simplicity of construction, to provide a blower or pump 18 entirely separate and distinct from the blower or pump 5 above referred to. The blower 18 is however of considerably greater capacity than the blower 5, since, in the present case, it serves seven times as many lines of tubing as the blower or pump 5. The blower 18 may be driven by an electric motor 19 and the air under pressure emerging from said blower passes through a drum 20 into a drum or reservoir 21. Upwardly extending from this latter, in pairs, are pipe sections 22 each of which is in communication with a valve casing 23 containing a controlling valve 24, normally held in its closed position by a spring 25 disposed at the pivot or hinge of said valve.

The valve is connected by means of a link 26 to a diaphragm 27 forming one wall of a diaphragm chamber 28 which forms a part of or may be connected to the casing 23. This chamber is preferably closed upon the opposite side thereof by a cover 29 to the upper side of which may be connected a small pipe 30. Through this latter, the air which accumulates in the chamber 28 upon the left-hand side of the diaphragm, as viewed in Fig. 4, escapes past a pilot valve 31 in a casing 32, when said valve 31 is opened in the manner hereinafter described. The air thus escaping past the pilot valve is delivered to the atmosphere through vents 33, so that the instant that valve 31 is opened, the air to the left of the diaphragm is restored to atmospheric pressure.

A timing conduit 34 connects the spaces upon the opposite side of the diaphragm and the seepage of compressed air from the pipe 22 into the chamber 28 is controlled or regulated by means of a needle valve 35, or the like.

A pipe 36 extends upwardly from each casing 23 to the corresponding terminal 15. The body of this latter may be covered by a suitable supporting plate 15' which covers the aperture in the surface of the desk 37 which receives the terminal 15.

The aperture 38 in the plate 15', through which carriers being despatched to the corresponding sub-station are introduced, is normally closed by a valve 39, pivoted at 40 to the underside of the plate 15'; said valve 39 being normally held in its closed position by a spring 41.

Valve 39 is provided with a downwardly extending arm 42 to which is pivotally attached a link 43; the lower extremity of this link being in turn connected to a lever 44 pivoted at 45; the pivot pin or shaft 45 in turn carrying an arm 46 which is adapted to press down upon a button 47 upon the upper end of the stem 48 of valve 31. This valve and its stem are normally held in their upper positions by a spring 49, disposed around the stem, the lower end of this spring bearing against the partition wall 50 in the valve casing and the upper end thereof bearing against a nut which clamps a small diaphragm 51 fast to the stem.

Above this diaphragm is a small chamber 52, the function of which is to provide an air cushion to prevent a too rapid closure of the valve 31, when this latter has once been opened.

A ball check valve 53 is normally held in its closed position by a small spring, which yields to the pressure of the outer air when the diaphragm 51 is moved downwardly; the valve 53 thereafter moving to its closed position and permitting the air trapped above the diaphragm to escape but slowly there-past to the atmosphere, when the button 47 is again free to rise.

Were it not for the provision of these parts, when a carrier is thrust rapidly through the opening 38, thereby swinging the arm 42 counter-clockwise and through the instrumentality of the link 43 causing the arm 46 to depress the button 27, the valve 31, thereby opened, might close before sufficient air had been allowed to escape from the chamber 28, which would result in but a partial opening of the valve 24 and a consequent under-timing of the carrier.

The operation of the system is as follows:

The clerks at the respective sub-stations despatch carriers of one class or another through the despatching boxes 7, as the exigencies of the business may require, and despite the fact that no separator is provided in the system, these carriers arrive sequentially in the shelf 13, corresponding to the given sub-station, from which they may be removed by the cashier or by the authorizer in the manner above described.

When the authorizer has removed, for example, a carrier 8' and after having examined the contents thereof, has approved the transaction, he may note such approval and re-despatch the carrier without effort, by merely depositing it in the terminal 15 corresponding to the clerk station for which the carrier is then destined. The carrier will then be delivered via the corresponding tube 16 to the terminal 17 at said clerk or sub-station; the entire operation having been conducted expeditiously and the customer not having been kept waiting any material length of time.

Correspondingly if the cashier receives in the shelf a carrier intended for him, he removes it without disturbing the credit carriers, and after making the necessary change, he also is able to despatch this carrier through the given terminal 15, with facility.

Since but a relatively small motor and blower serve the incoming or vacuum line, and since a large number of stations are served by these lines, in an installation of any magnitude in a busy store, it will usually not be necessary to provide a timing or power saving device in connection with this motor or blower. On the other hand, since a separate tube 16 extends from the central desk to each sub-station, it is usually preferable to provide some form of power-saving device, such as that shown in Fig. 4, whereby to conserve the pressure fluid. In this case the needle valve 35 of each outgoing line is adjusted so as to time the flow of compressed air past the corresponding valve 24 to permit of the sure delivery of the carrier to the station for which it is destined, and to close said valve 24 directly thereafter.

It will be understood of course, that when the chamber 28 is vented in the manner above described, the pressure of the air to the right of the diaphragm 27 moves said diaphragm to its dotted line position and thereby swings open the valve 24 against the action of its spring 25. The spring 25 then tends to move the valve 24 toward its closed position and after the valve 31 has closed the compressed air gradually fills the chamber 28 until the pressure upon opposite sides of the diaphragm 27 is equalized which permits the spring 25 to perform its function.

By the arrangement of parts shown the run of the line of tubing is considerably shortened, which of course tends to speed up the service and insure better deliveries. The provision of the extended trough-like chute 13 in combination with the other parts, permits of bringing carriers of several different kinds into the central station consecutively by banks, and in such a way that the operators placed preferably upon each side of the central desk, may easily reach the carriers and re-despatch them in the manner above described.

The central desk construction is simplified as much as possible by reducing the number of tubes and by changing their direction or location, as compared to the practice heretofore in vogue, in such a manner that the outgoing lines will not obstruct the operating space between the operators.

If further, what is known as a general monitor service is employed in connection with the system, the herein described construction simplifies this service by bringing the carriers in consecutively by banks, so that but one carrier timing and counting device may be used for an entire bank.

As such monitor systems are now in common use in connection with the pneumatic despatch tube apparatus installed in many large department stores, a detailed description of the timing and counting devices need not here be given; but I have indicated such devices in place upon each shelf, said devices being broadly designated 54.

The reduction in cost of establishing apparatus such as that herein described, which is capable of rendering the service of which such apparatus is capable, as compared with known equipment intended to afford a similar service, is indeed very considerable; this being due in large part to the elimination of, for example, six incoming lines on a bank of seven, the doing away with the same number of separators and terminals, and the reducing of the monitor equipment to a minimum.

Not only is this the case, but the clerk or sub-station apparatus is also rendered as compact as possible so that it may be installed in less space and more conveniently than in most known types of apparatus.

The provision of separate motors and blowers, preferably of different sizes, for the outgoing and incoming lines, is particularly advantageous, since it permits of the use of a system which need not be provided with automatic pressure release valves, and the like; but as I am aware of the fact that such devices are known, I do not wish to be limited to this provision of separate motors and blowers, except where particularly specified in the claims.

I also desire to point out that with this type of service, differing as it does from corresponding systems involving separators and the like, it is possible to use simpler and less expensive carriers than can be used in such separator systems. A further very great advantage in the present system is that it reduces the size of the central station fifty per cent., if desired, or even seventy-five per cent. if necessary and practical. By reason of this reduction in size, the construction can be installed on mezzanines, or in places where there is less elevation than is required for most known types of apparatus which are intended to accomplish similar general results.

In this connection it may be well to note the advantage of disposing the carrier receiving terminals in pairs, the receiving sections of which extend oppositely and obliquely but in a common vertical plane. Substantially all incoming and outgoing tubes, at the desk, together with the despatching terminals, also lie in this plane.

In many instances, particularly in retail stores, it is desirable to install the central desk in the center of a given floor; but with the known types of service, most merchants object to this; since the desks are so unsightly, rendered so by reason of the large number of tubes extending thereto, and since they obstruct the view. By constructing the system in the manner above described however the incoming lines are so materially reduced in number that this objection is largely overcome, providing that the outgoing lines are run to a wall or beneath the floor, in the manner described.

I particularly desire to emphasize the value in certain cases, of providing means for creating a continuous flow of air through the in-coming tube, leading from the sub-stations to the central desk, while the carrier transmitting flow of air out from the desk to any of the sub-stations is automatically limited.

Such a construction reduces the parts at the sub-stations to a minimum, entirely eliminates electrical wiring and the like, provides the requisite service, and yet does not sensibly waste power if the system be a reasonably busy one.

In general, the described adequate service with a maximum of efficiency and a minimization of the number of parts in a system of this description has been the result aimed at and achieved by the combination above set forth and it is believed that while certain parts of the apparatus, such for example as the provision of a plurality of out-going tubes in combination with a single return tube therefor, are known, this feature having been disclosed in the patent to John T. Needham, No. 976,744, dated Nov. 22, 1910, nevertheless such service cannot possibly be afforded by such known constructions.

This service, to be adequate for large department stores and the like, should permit of the receipt at the central desk of carriers, preferably of different classes, which should be presented to the operators stationed at the desk, in the order of their arrival thereat, with the carriers of each class sequentially disposed with respect to each other but permitting of the removal of carriers of one or another class without disturbing the sequential order of the remaining carriers, and the system should further permit of the prompt despatch of carriers from the central desk to different sub- or out-stations, simultaneously whenever necessary.

Finally, where a receiving and presenting device such as that designated 13 is used, it will be apparent from an inspection thereof that it must be adapted to present at least four carriers simultaneously to the operators at the corresponding set of stations; since if but two or even three carriers be exposed, these will almost as like as not be all of the same class while the next carrier behind which should most certainly be visible on account of the fact that it may very possibly be a credit carrier, for example, which requires immedate attention,—will be held up and the customer correspondingly delayed until at least one of the carriers ahead has been attended to.

Having thus described my invention what I claim is:

1. In a pneumatic despatch tube system, the combination of carriers of different classes, with a central desk, an extended inclined shelf for simultaneously holding and exposing to view a plurality of said carriers of different classes, said shelf being disposed above the surface of said desk and being open upon one side thereof to afford immediate access to any selected one of said carriers from either side of said desk substantially regardless of the disposition of the selected carrier in the sequence of carriers in said shelf, a group of despatching terminals all located substantially beneath said shelf and freely accessible from either side of said desk, a plurality of sub-stations, a single incoming transmission tube leading from said sub-stations to said shelf, a plurality of out-going transmission tubes extending from the respective terminals in said group to the respective sub-stations, and means to establish air currents through said tubes for transmitting carriers between said sub-stations and said desk.

2. In a pneumatic despatch tube system, the combination of carriers of different classes, with a central desk, an extended inclined shelf for simultaneously holding and exposing to view a plurality of said carriers of different classes, said shelf being disposed above the surface of said desk and being open upon one side thereof to afford immediate access to any selected one of said carriers from either side of said desk substantially regardless of the disposition of the selected carrier in the sequence of carriers in said shelf, a group of despatching terminals disposed beneath said shelf in substantial alinement longitudinally of said desk surface and freely accessible from either side of said desk, a plurality of sub-stations, a single in-coming transmission tube leading from said sub-stations to said shelf, a plurality of out-going transmission tubes extending from the respective terminals in said group to the respective sub-stations, and means to establish air currents through said tubes for transmitting carriers between said sub-stations and said desk.

3. A pneumatic despatch tube system comprising carriers of different classes, a central desk adapted to accommodate an operator for each of said classes of carriers, a plurality of sub-stations from which said carriers may be despatched to said desk, an in-coming transmission tube for conveying said carriers from said sub-stations to said desk, means to simultaneously present to the operators stationed at said desk, carriers of said different classes in the order of their arrival at said desk, out-going transmission tubes extending from said desk to the respective sub-stations, and means connected to said out-going tubes and beneath said presenting means, to permit said operators to simultaneously re-despatch carriers of different classes, from said desk to a plurality of said sub-stations.

4. A pneumatic despatch tube system comprising carriers of two different classes, a central desk having stations for operators for each of said classes of carriers, a station for one class of carriers being on one side of said desk and the station for the other of said classes being on the opposite side of said desk, a plurality of sub-station from which said carriers of either class may be despatched to said desk, an incoming transmission tube for conveying said carriers from said sub-stations to said desk, means, substantially midway between said stations, to receive the carriers transmitted through said tube and to simultaneously present them to the operators at the respective stations aforesaid, out-going transmission tubes extending from said desk to the respective sub-stations, and a group of outgoing-tube despatching terminals located along a line which extends longitudinally of said desk substantially midway between said stations, the despatching terminals of said group being common to both of said stations and permitting said operators to simultaneously redespatch carriers of different classes from said desk to a plurality of said sub-stations, said carrier receiving means being adapted to simultaneously present to said operators at least four of said carriers.

5. A pneumatic despatch tube system comprising carriers of two different classes, a central desk having a plurality of stations on opposite sides of it respectively for operators for each of said classes of carriers, ingoing and outgoing carrier transmitting tubes serving said desk, the extremities of said tubes at said desk being substantially in a common vertical plane, at least one pair of receiving terminals to co-act with said ingoing tubes, each of said terminals comprising an obliquely disposed carrier holding section which is open to simultaneously expose a plurality of carriers to the corresponding operators on opposite sides of said section and of said desk, the said sections of a pair of said terminals being both substantially in said plane but oppositely extending therein, and despatching terminals for said outgoing tubes, also located substantially in said vertical plane.

In testimony whereof I have affixed my signature, in the presence of two witnesses.

FREDERICK GAGE WHITTIER.

Witnesses:
DAISY L. BENNETT,
ALICE G. CONWAY.

Copies of this patent may be obtained for five cents each, by addressing the "Commissioner of Patents, Washington, D. C."